June 4, 1968  O. W. BURKE, JR., ET AL  3,386,810
APPARATUS FOR THE PRODUCTION OF SILICA PIGMENTS
Original Filed Oct. 3, 1961
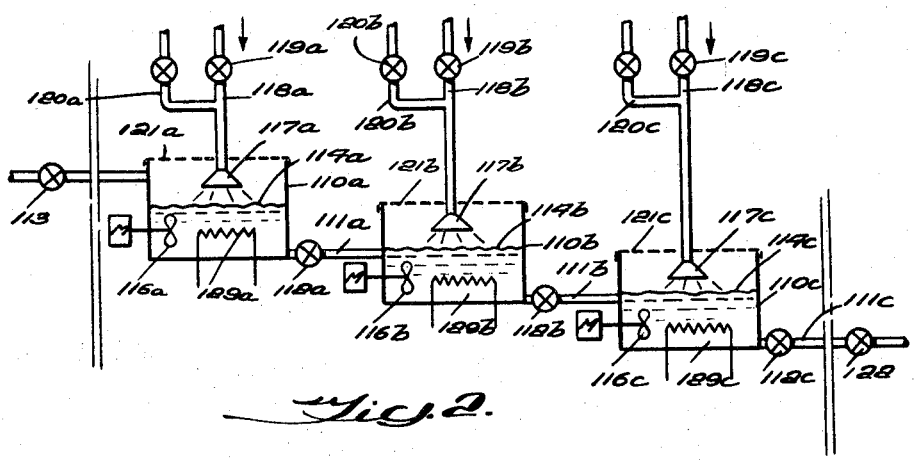
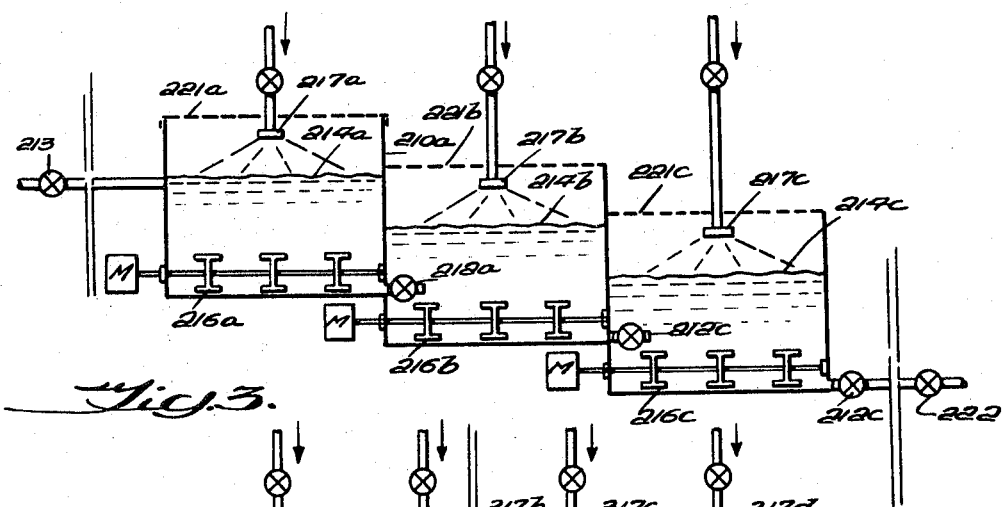
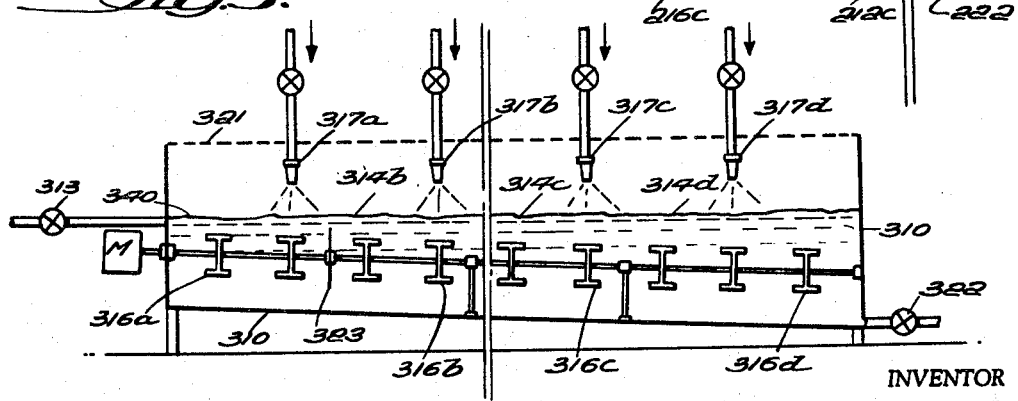
INVENTOR
OLIVER W. BURKE JR.
CAREY B. JACKSON,
BY *Hall & Houghton*
ATTORNEY

3,386,810
APPARATUS FOR THE PRODUCTION OF SILICA PIGMENTS
Oliver W. Burke, Jr., 506 Intracoastal Drive, Fort Lauderdale, Fla. 33304, and Carey B. Jackson, Pompano Beach, Fla.; said Jackson assignor to said Burke
Original application Oct. 3, 1961, Ser. No. 142,668, now Patent No. 3,256,068, dated June 14, 1966. Divided and this application Apr. 18, 1966, Ser. No. 543,378
1 Claim. (Cl. 23—285)

This application is a division of application Ser. No. 142,668, filed Oct. 3, 1961, now Patent No. 3,256,068 issued June 14, 1966 and has been filed pursuant to a requirement for restriction made therein under 35 U.S.C. 121.

This invention relates to apparatus for the production of silica pigments from sodium silicate and aims generally to improve the same.

Objects

Particular objects of the invention, severally and interdependently, are to provide apparatus peculiarly suited for the continuous production of silica pigment of the rubber reinforcing type; to provide apparatus for flowing the aqueous sodium silicate solution through a series of reaction zones in a single pass and for introducing acidulating fluid thereinto in a manner promoting the uniformity of reduction of alkalinity of the solution in each zone; to provide apparatus for producing turbulence, but preferably not violent agitation, at each zone; to provide means facilitating the injection of acidulating liquid and/or gas at respective zones; to provide means for adjusting the flow of acidulating fluids to the respective zones in relation to each other and to the rates of flow of the aqueous sodium silicate solution through said zones for regulating the relative rates of acidulation at the respective zones; to provide means for introducing non-acidulating electrolyte into selected ones of said respective zones; and generally to provide simple and effective combinations of apparatus for the purposes described.

Other objects and advantages of the invention will be apparent from the following description of illustrative embodiments thereof. The invention resides in the new and useful features and the new and useful combination of features hereinafter described, and is more particularly pointed out in the appended claims.

Drawings

In the accompanying drawings of illustrative embodiments of the invention FIGS. 1 to 3 are diagrams in side elevation or longitudinal cross section of respective embodiments of the invention, with paired broken lines indicating portions omitted for compactness of illustration.

General description

It is known that one can prepare silica pigment material suitable for the reinforcement of rubber by gradual acidulation of aqueous sodium silicate solution with or without the presence of excess sodium ion. Thus in British Patent No. 299,483 (Peter Spence & Sons Ltd.) acceptance Oct. 29, 1928, such a silica pigment is produced in a substantially pure, extremely light form by neutralizing the alkali of a sodium silicate solution in the presence of a suitably regulated amount of sodium carbonate, by the gradual addition of sodium bicarbonate or carbon dioxide, the sodium carbonate being already present or being added as required, or being formed by the gradual addition of a solution of sodium bicarbonate or carbon dioxide. In British Patent No. 561,750 (E. K. Cole, Ltd.) accepted June 2, 1944, a similar process is disclosed, acidulating sodium silicate by the gradual addition of a mineral acid in the presence of electrolytes including sodium chloride and salts of weak acids or weak bases or both. By these processes it is known to obtain a gradual separation of the silica in a non-gelatinous, somewhat flocculent, easily filterable white and opaque condition in combination or association with a portion of the alkali and in a physical condition such that after removal of the mother liquor, washing with water, after-treating with dilute acid and again washing and drying, the silica pigment shrinks but little compared with silica gel and is in an extremely light, white, soft and bulky form.

In the precipitation of silica by such known gradual acidulation of sodium silicate solutions as heretofore practiced, it is established practice to add acidulating agent at a constant slow rate throughout the course of the acidulation at least until all the silica has been precipitated. Only by so doing has it been considered possible to obtain silica in the form of pigment rather than in the form of a gel.

In our copending applications Ser. Nos. 142,494; 142,496; 142,662 and 142,665, filed Oct. 3, 1961, which have matured into United States patents as follows:
Ser. No. 142,494, Patent No. 3,202,525, Aug. 24, 1965; Ser. No. 142,496 (continuation-in-part allowed Jan. 27, 1967); Ser. No. 142,662, Patent No. 3,172,726, Mar. 9, 1965; Ser. No. 142,665, Patent No. 3,172,727, Mar. 9, 1965, we have disclosed improved processes in which recycling is employed, in which the rates of acidulation are varied as the acidulation proceeds to obtain definite improvements, in which different acidulating agents are employed at different stages of the process to obtain definite advantages, in which electrolyte is introduced in a new manner to obtain certain improvements, etc.

In the practice of the known prior art processes above referred to, it has been the practice to form a confined body of an aqueous sodium silicate with or without a content of electrolyte in a vessel or tank and to then treat said body batchwise by the gradual addition of a single selected acidulating agent thereto until the mole ratio of the total silica in the body to the unneutralized sodium oxide of the body reached a value such that the sodium silicate became gradually separated from the solution in the form of silica pigment. In common with the prior art the above mentioned improvements of our copending applications may likewise be practiced in a batchwise manner. However, by the present invention it is made possible to practice the process of gradual acidulation of sodium silicate solution, and our above mentioned improvements thereon, in a continuous manner, with better and/or more flexible control of the reacting and separation modifying agents. Thus the present apparatus may be employed for the continuous practice of any of the aforesaid processes.

In general in its several species the present invention comprises (a) means defining a series of reaction zones, (b) means for turbulently flowing sodium silicate solution in a single pass through said zones in sequence, and (c) means in each zone for injecting thereinto acidulating fluid whereby controlled reduction of alkalinity in respective zones is promoted notwithstanding the continuous flow of the stream being acidulated. In particular species the means (c) comprises means in more than one of said zones for injecting thereinto acidulating fluid, such means preferably positioned above the level of the turbulently flowing liquid in the reaction zones when liquid acidulating fluid is being employed and preferably positioned below the level thereof when gaseous acidulating fluid is being employed, and which may be positioned or positionable in both locations e.g. when both types of fluid are being employed. In other species the invention also comprises (d) means in respective zones for injecting thereinto aqueous salt solution, i.e. aqueous electrolyte solution other than acidulating agent, for assisting in determining the size and nature of the silica pigment material formed such that it can constitute a reinforcing filler for rubber and the like.

*Detailed description of particular embodiments*

Referring now to the drawings, in FIG. 1 the means defining a series of reaction zones comprises a series of vessels 110a, 110b, etc., connected in cascade or series by conduits 111a, 111b, etc., respectively provided with flow control means shown as valves 112a, 112b, etc., which may be adjusted manually or by level controlled means as hereinafter described, to maintain predetermined mean liquid levels 114a, 114b etc., of the turbulently flowing liquid in the respective zones. The means (a) also includes an inlet conduit 113 for delivering the aqueous sodium silicate solution from any suitable supply, as an elevated tank, or other supply under pressure, which inlet is preferably provided with a control valve adjustable manually or by automatic means responsive to the level of liquid in the tank 110a, for example, for maintaining the supply at such a rate as to properly maintain the liquid levels in the respective tanks.

Still referring to FIG. 1, the means (b) for turbulently flowing the solution through the series of tanks also comprises agitating means at each zone, herein shown in the form of motor driven submerged impellers 116a, 116b, etc., of the fan blade type located in the respective vessels 110a, 110b, etc.

The means (c) for injecting acidulating fluid into the turbulently flowing liquid at each acidulating zone in FIG. 1 comprises suitable means such as spraying nozzles or spray heads 117a, 117b, etc., associated with the respective vessels, and provided with individual supply pipes 118a, 118b, etc., which are respectively controlled by valve means 119a, 119b, etc., adjustable to regulate the flow of acidulating fluid into the turbulently flowing liquid in the associated tank to suit the requirements of the process as being carried out therein. In this embodiment the means (d) for supplying the electrolyte to the respective tanks or vessels 110a, etc., may consist of further nozzles such as those just described, connected to a suitable source of electrolyte solution and associated with certain of the said vessels, preferably those associated with the early stages of the acidulation, or may consist of valved supply connections such as 120a, 120b, etc., for delivering the electrolyte solution through selected ones of the spray heads 117a, 117b, etc., along with or in alternation with the acidulating fluid supplied therethrough.

Still referring to FIG. 1, in the form there shown the tanks or vessels 110a, 110b, etc., may be uncovered, but preferably are covered or closed as indicated by dotted lines as 121a, 121b, etc. The level of the free surface 114a, 114b, etc., maintained in each vessel or in selected vessels may be raised or lowered by adjustment of the valve means 112a, 112b, etc., and 113, or the nozzles 117a, 117b, etc., may be lowered, when it is desirous to inject the acidulating fluid below the free surface of the liquid 114a, or 114b, etc.

In operation, in FIG. 1 the sodium silicate solution to be acidulated is admitted to the first of the series of vessels by the valve 113 and agitated by agitator 116a while acidulating fluid is sprayed thereinto by the spray head means 117a, at a rate so correlated with the rate of throughput established by the adjustment of the valves 112a and 113 as to statistically effect a predetermined degree of acidulation of the flowing liquid. As above noted for practicing the invention of our application Ser. No. 142,496 and now abandoned, electrolyte solution may also be supplied to this vessel along with the acidulating fluid. The liquid then flows from vessel 110a through the valve controlled conduit 111a to the next vessel of the series, 110b, wherein it is further agitated and acidulated and/or supplied with electrolyte solution as just described, so that statistically the solution attains a further predetermined degree of acidulation and/or electrolyte concentration in this vessel. After passing through several vessels, the exact number of which may be determined by the rate and degree of acidulation and/or electrolyte addition to be effected in each, a point will be reached at which precipitation of silica is incipient, i.e., is about to commence or has just started to commence. At this time, in the practice of the invention of our copending application No. 142,661 and now abandoned it is desirable to considerably augment the rate of acidulation for reasons therein set forth. Accordingly, in using the present apparatus for carrying out this process the flow rate and rates of acidulation are preferably so adjusted that the solution being acidulated passes, as it reaches such state of incipient precipitation, into another vessel, herein exemplified by the vessel 110c, in FIG. 1, to which acidulating fluid is supplied at a considerably greater rate per unit volume of the solution being acidulated, than is the case in the earlier vessels of the series. In this vessel and/or one or more succeeding vessels, the acidulation is carried to completion, and if desired, additional acidulating agent may be added to aid in reducing the alkalinity of the precipitated silica as compared to the alkalinity thereof as precipitated. When the desired degree of precipitation and acidulation has been statistically attained in the last tank of the series, the silica slurry is delivered therefrom through valved outlet means as exemplified at 122 for separation of the silica from the solution, washing thereof, after-treatment as desired, and final washing and drying to produce a silica pigment material suitable for the reinforcement of rubber.

As above mentioned, the vessels 110a, etc., may be closed, and in such case may be run completely or substantially full of liquid, as will be apparent from the description of closed embodiments hereinafter. In such event, the closed reaction zone or zones may be operated under pressure, and the inlet and outlet valves may be adapted for such operation. When the process performed is conducted at elevated temperature, suitable provision for heating may be made, as illustrated at 129a, 129b, etc., wherein heating coils selectively operable for heating the respective tanks as desired, are indicated.

Turning now to FIG. 2, the embodiment therein shown is generally similar to that of FIG. 1 and the corresponding parts are designated by like reference numerals increased by 100 in number as compared to FIG. 1. In this form, in lieu of the fan blade type agitators shown in FIG. 1 paddle type agitators 216a, 216b, etc., appropriately driven through speed reducing motors are employed, and it will be understood that these may be of any suitable construction and may be used interchangeably with any other form of agitator suitable for the purpose as, for example, the form 116a. In this embodiment, the liquid levels in selected ones of the vessels may be adjusted so that the paddles of the agitators 216a, etc., may remain completely submerged as shown, or so that they will break through the free surface of the liquid being treated. The latter condition may be desirable in the initial stages of the acidulation as well as in the addition of electrolyte solution to the flowing sodium silicate solution, when such is to be employed and is not already present in the solution as introduced through the inlet valve 213. The modes of operation of this form are similar to and as flexible as those of the form of FIG. 1.

In the embodiment of FIG. 3, the means defining a series of reaction zones takes the form of a relatively narrow elongated vessel or trough 310, which preferably has a slightly sloping bottom as shown, to facilitate draining of the apparatus, and which preferably is provided with cover means 321 constructed of sections which may be removed when desired. This trough may be considered as corresponding to a series of interconnected reaction zones each defined by the walls of the trough proximate to the respective nozzle means 317z, 317b, etc., which correspond to the spray devices of the embodiments of FIGS. 1 and 2. The elements corresponding to those in the said figures are identified by similar reference numerals of the 300-series. In this form, the agitating means shown as paddles 316a, 316b, etc., for the respective zones, are carried on a common shaft driven by a single motor means and the free surfaces of the several zones 314a, 314b, etc., are at the same level, substantially, and form a single continuous free surface. The modes of operation are generally similar to those of FIGS. 1 and 2 except that the relative length and narrowness of the trough may be relied on to regulate the uniformity of progress of the acidulation etc., as the sodium silicate solution being treated progresses down the trough. However, baffles, shown as circular plates 323 carried by the shaft of the paddle agitators 316a, 316b, etc., and as of less area than that of the cross section of the trough, may be employed to provide a further guard against channeling of the solution through lateral portions of the trough. This may be desirable, especially when operating at such temperatures as require prolongation of the time employed for completion of the slow acidulation necessary to produce pigment capable of serving as a rubber reinforcing filler after appropriate conditioning.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claim, and that all modifications that come within the meaning and range of equivalents of the claim are intended to be included therein.

We claim:
1. Apparatus for the continuous production of silica pigment by the acidulation of aqueous sodium silicate solution, said apparatus comprising (a) means defining a series of reaction zones, (b) means for turbulently flowing aqueous sodium silicate solution in a single pass through said zones in sequence, and (c) means in more than one of said zones for injecting thereinto acidulating fluid, and wherein: said means (a) comprises a series of reaction chambers having restricted communication therebetween, the chamber at one end of said series having means for introducing aqueous sodium silicate solution thereinto and the chamber at the other end of said series having means for discharging therefrom the slurry of silica pigment precipitate produced by the reaction: and said means (c) comprises inlet means for acidulating fluid located to discharge such fluid into said chambers and means for adjusting the flow of acidulating fluid to the respective ones of said chambers through said respective fluid inlet means relative to each other and to the rate of flow of said aqueous solution through said chambers, for regulating the relative rates of acidulation of said solution effected at respective chambers; wherein said means (a) comprises a continuous trough and baffles dividing said trough into said series of chambers and restricting communication between said chambers and thus guarding against channeling of the solution through said chambers; and wherein said means (b) comprises a shaft extending longitudinally of said trough and agitator means carried by said shaft, and said baffles are in the form of plates carried by said shaft and extending transversely of portions of said trough.

References Cited
UNITED STATES PATENTS 2,527,340  10/1950  Taylor _____ 23—65
2,760,850  8/1956  Lambert et al. _____ 23—285

FOREIGN PATENTS 1,091,568  10/1960  Germany.

JAMES H. TAYMAN, Jr., *Primary Examiner.*